US011910301B2

(12) United States Patent
Giraldo-Suarez et al.

(10) Patent No.: US 11,910,301 B2
(45) Date of Patent: Feb. 20, 2024

(54) METHOD AND SYSTEM FOR DETECTING STATIONS IN WIRELESS LOCAL AREA NETWORKS

(71) Applicant: AOIFE SOLUTIONS, S.L., Camas (ES)

(72) Inventors: Enrique Giraldo-Suarez, Camas (ES); Victor Berrocal-Plaza, Camas (ES); Jose Ayub Gonzalez Garrido, Camas (ES); Jose Antonio Delgado Alfonso, Camas (ES)

(73) Assignee: AOIFE SOLUTIONS, S.L., Camas (ES)

( * ) Notice: Subject to any disclaimer, the term of this patent is extended or adjusted under 35 U.S.C. 154(b) by 277 days.

(21) Appl. No.: 17/600,419

(22) PCT Filed: Jul. 29, 2019

(86) PCT No.: PCT/EP2019/070321
§ 371 (c)(1),
(2) Date: Sep. 30, 2021

(87) PCT Pub. No.: WO2020/259861
PCT Pub. Date: Dec. 30, 2020

(65) Prior Publication Data
US 2022/0225221 A1 Jul. 14, 2022

(30) Foreign Application Priority Data

Jun. 27, 2019 (ES) .................. ES201930598

(51) Int. Cl.
*H04W 48/16* (2009.01)
*H04W 84/12* (2009.01)
(52) U.S. Cl.
CPC ............ *H04W 48/16* (2013.01); *H04W 84/12* (2013.01)

(58) Field of Classification Search
CPC ............................ H04W 48/16; H04W 84/12
See application file for complete search history.

(56) References Cited

U.S. PATENT DOCUMENTS

2009/0323972 A1* 12/2009 Kohno ................ G06F 21/6245
380/284
2013/0201842 A1 8/2013 Chou et al.
(Continued)

FOREIGN PATENT DOCUMENTS

EP 2979401 B1 7/2019

OTHER PUBLICATIONS

International Search Report and Written Opinion for Corresponding International Application No. PCT/EP2019/070321 (14 Pages) (dated Dec. 17, 2019).

(Continued)

*Primary Examiner* — Duc C Ho
(74) *Attorney, Agent, or Firm* — Lucas & Mercanti, LLP

(57) ABSTRACT

Method and system for detecting stations in wireless local area networks having at least one access point configured to: upon transmission of an association response to a station, send a radio measurement request to the station performing active scanning of a SSID having a unique identifier univocally associated with a persistent MAC address of the station, upon reception of a probe request, check if the SSID field has a unique identifier univocally associated with a persistent MAC address of a station, and associate the source address of the probe request with the persistent MAC address of the station on a database of known stations; detect stations within the coverage area of the access point based on the information stored on the database of known stations.

13 Claims, 15 Drawing Sheets

(56) References Cited

U.S. PATENT DOCUMENTS

2015/0373692 A1 12/2015 Jern et al.
2016/0135053 A1* 5/2016 Lee .................. H04W 12/02
                                                726/7
2018/0248871 A1* 8/2018 Tsirkin ............... H04W 12/06

OTHER PUBLICATIONS

International Preliminary Report on Patentability for Corresponding International Application No. PCT/EP2019/070321 (19 Pages) (dated Sep. 8, 2021).

* cited by examiner

Table 1

| STA_MAC 702 | RandMAC 704 | time 706 | counter 708 |
|---|---|---|---|
| 42:b0:da:4a:ad:47 | e5:a6:0d:57:7f:cc | 15355 | 5 |
| 25:8b:dc:e9:87:47 | 32:8f:34:0f:3f:0c | 15380 | 2 |
| a6:05:ed:60:ad:75 | 66:59:f0:17:3a:58 | 15384 | 0 |
| fe:5b:e7:19:fa:32 | ? | 15392 | 4 |
| 2c:ca:a7:a3:94:75 | 2c:ca:a7:a3:94:75 | 15399 | 1 |

DATABASE OF KNOWN STATIONS 316

Fig. 7

METHOD AND SYSTEM FOR DETECTING STATIONS IN WIRELESS LOCAL AREA NETWORKS

CROSS REFERENCE TO RELATED APPLICATION

This application is a 371 of PCT/EP2019/070321, filed Jul. 29, 2019, which claims the benefit of Spanish Patent Application No. P201930598 filed Jun. 27, 2019, each of which are incorporated herein by reference.

FIELD OF THE INVENTION

The present disclosure relates to wireless communication systems, and more particularly to methods and systems for managing the randomization of the MAC address of Wi-Fi stations, and more particularly for detecting stations (which may use MAC address randomization) in wireless local area networks.

BACKGROUND OF THE INVENTION

Some current Wi-Fi chipsets include MAC address randomization to prevent the tracking of users by using the information contained in probe request frames. When probing for wireless networks, the Wi-Fi station (STA) periodically sends probe request frames to the radio-electric medium asking to join in any of its configured wireless networks (a mechanism which is commonly known as active scanning). FIG. 1 shows the format of the probe request frame defined by the IEEE 802.11 standard. These probe request frames are sent without encryption, and include the following information:
  Address 2 (Source Address, SA): MAC address of the wireless network interface card of the device that sent the message.
  SSID: Service Set Identifier of the wireless network wherein the STA wants to be connected.
  SSID List: List of SSIDs that the STA was previously connected to.

Using this unencrypted information, any person skilled in the art can obtain all the wireless networks that a user was previously connected to by simply inspecting the 'SSID List' field within the probe requests sent by the user's terminal. Furthermore, network administrators usually configure an SSID which is somehow related to the location wherein the wireless network is deployed. For example, a common SSID may be the name of an airport, the name of a restaurant, etc. This way, any skilled in the art may easily retrieve the points of interest of a set of Wi-Fi users and use this information to infer personal information such as gender, age, and even relationships between Wi-Fi users.

When facing with such privacy issue, Wi-Fi manufacturers have implemented different ways to randomize the MAC address that the STAs use to transmit information through the radio-electric medium (i.e. Address 2 in the probe request frame). Some Wi-Fi vendors opt to only randomize the MAC address transmitted in probe request frames. Others implement a mechanism wherein the STA uses a different MAC address every time the STA tries to be associated with a different Wi-Fi Access Point (AP). Afterwards, once the STA is associated with a new AP, the STA uses that MAC address for all its transmitted frames. These two last mechanisms can be jointly used to implement a two-step MAC randomization.

These mechanisms of MAC address randomization are very efficient and simple ways to hide relations between the information sent in probe requests and personal information about a specific user. However, the use of different MAC addresses for different management frames during the same session adds ambiguity to the network state and may therefore affect the operation of the network resource optimizers. For example, some optimization algorithms use the source MAC address transmitted in probe request frames to determine the number of STAs in the coverage area (e.g. as many STAs as the number of unique MAC addresses received in probe request frames). Other mechanisms use the periodicity of probe requests to know when an STA is receiving low signal levels (some STAs increase the frequency of probe requests with the aim of increasing the probability of finding a nearer AP when they detect low signal levels from their current AP). Therefore, to avoid such ambiguity, it is necessary a mechanism able to make an association between the MAC address transmitted in probe requests and the MAC address transmitted in other management frames.

There are some prior-art proposals related to MAC randomization. S. B. Lee et al. propose in [1] a method where the access point selects its random MAC (referred as OTA MAC in [1]) and, only after establishing a secure channel, the access point and the stations exchange their respective random and permanent MAC addresses to be able to communicate by using their random MAC addresses. For that, these OTA MACs are exchanged in a message of the association process because the association process commonly requires a secure handshake procedure. On the other hand, the authors propose that the probe request sent by an STA should comprise a value derived from the STA random MAC and a pairwise shared key known to the AP and the STA, and the destination address (DA) of the probe request should be associated with broadcast transmissions to the AP. After receiving a probe request, the AP only sends a probe response if and only if it is able to check that the received value is derived from the randomly selected MAC address and the pairwise shared key. Therefore, S. B. et al. define in [1] a method where the AP and the STAs should be coordinated when selecting their respective random MAC addresses and, furthermore, this information should be exchanged by using the secure channel established during the association process. In [2], S. B. Lee et al. describe the operation of an STA in the system which was also defined in [1].

T. M. F. Pang describes in [3] a method to detect and avoid collisions due to duplications of randomized MAC addresses. In that method, every wireless device must announce its intention of using a random MAC address. The wireless device in question would use that random MAC only in case of such random MAC address is not used by other wireless device within the same wireless network. This way, all the MAC addresses used in a wireless network are unique.

Finally, M. Tsirkin proposes in [4] a method to avoid user tracking by using MAC randomization and hiding the 'SSID List' field within probe requests. For that, the invention explained in [4] defines a method to be implemented in an STA, which comprises: (i) send probe requests without the field 'SSID List'; (ii) receive probe response from surrounding APs; (iii) generate the random MAC address; (iv) and authenticate and connect to one of the configured SSIDs by using that random MAC address. The invention described in [4] is exclusively focused on the operation of a Wi-Fi station to prevent user tracking.

Therefore, in order to optimize the resources of wireless local area networks, it is necessary a solution that takes into account the MAC address randomization processes performed by the stations and is able to monitor the actual number of stations in a coverage area without requiring any type of modification performed in the stations or any type of coordination between the access points and the stations when selecting the respective random MAC addresses.

REFERENCES

[1] S. B. Lee, J. K. Malinen, and G. Cherian, "Wi-Fi privacy in a wireless station using Media Access Control address randomization", Qualcomm Inc., US 2016/0135041 A1.
[2] S. B. Lee, et al., "Wi-Fi privacy in an access point using Media Access Control address randomization", Qualcomm Inc., US 2016/0135053 A1.
[3] T. M. F. Pang, "Random Media Access Control address collision detection and avoidance for wireless network", Cisco Technology Inc., US 2018/0077742 A1.
[4] M. Tsirkin, "Enhancing privacy of network connections", Red Hat Inc., 2018/0248871 A1.

DESCRIPTION OF THE INVENTION

The invention relates to a system and method of managing MAC address randomization and detecting stations in a wireless local area network. The invention tackles the network ambiguity problem derived from MAC randomization.

The method of detecting stations is implemented in one or more access points of at least one wireless local area network. The method comprises:
Upon transmission, by at least one access point of a wireless local area network, of an association response to a station, sending (by the corresponding access point) a radio measurement request addressed to the station. The radio measurement request includes a command to perform active scanning of an SSID comprising a unique identifier univocally associated with a persistent MAC address of the station.
In response to a probe request received by each access point, checking if the SSID field of the probe request comprises a unique identifier univocally associated with a persistent MAC address of a station, and in that case associating the source address of the probe request with the persistent MAC address of the station on a corresponding database of known stations. The corresponding database of known stations may refer to a global database shared by all the access points implementing the method or a database per access point (in the latter case, each database is individually maintained by the corresponding access point).
Detecting stations within the coverage area of the access point based on the information stored on the database of known stations.

Another aspect of the present invention refers to a system for detecting stations in wireless local area networks. The system comprises at least one access point of one or more wireless local area networks, wherein each access point of the system comprises a control unit or data processing means configured to implement the method of detecting stations previously described. The access point also comprises, like any other access point, the appropriate transmitter and receiver units for wireless communication.

A further aspect of the present invention refers to a presence detection or device detection method and system. When installed in a public area, such as a shopping mall, the presence detection system can determine the number of devices connected to the wireless local area network(s) of the public space using the information stored on the database of known stations. The method of detecting stations may include performing further actions based on the number of detected stations, such as balance the data traffic load in the wireless network or reporting the number of detected stations or the amount of time each station is detected within the coverage area.

According to a yet further aspect of the present invention, a method and system for load balancing in wireless local area networks is herewith provided. The method of load balancing comprises a first step of determining the stations which are within the coverage area of each access point of a plurality of access points that implement the method of detecting stations previously described. Thereafter, load balancing can be applied to one or more wireless local area networks corresponding to the plurality of access points. The load balancing is performed by at least one load balance unit. The load balancing is determined based at least on the detected stations within the coverage area of each access point. The load balancing normally also considers the traffic load of each station, which may be obtained by any known method.

The present invention solves the above-mentioned problem of monitoring the actual number of stations in a coverage area to optimize the operation of the wireless local area network(s), despite the use by the stations of MAC address randomization processes, by having a unique association between a MAC address and the user's terminal while the station (i.e. the user's terminal) is associated with an access point.

This MAC address may be the unique MAC address of the terminal's wireless network interface card or, alternatively, a random MAC address, which may be static (at least while the station is associated with an access point) or dynamically changed (e.g. after one or more management frames are sent). For the purpose of the invention described herein, the station may use a different MAC address every time it is associated with a new access point. Therefore, it should be understood that the invention described herein is not aimed to infer personal data from the frames transmitted or received by the user's terminal.

In the present invention, certain actions are only defined to be made by the access point. Unlike other prior-art proposals dealing with MAC address randomization, in the present invention the station only performs certain commands sent from the access point according to the rules already provided by the IEEE standard. Therefore, the invention disclosed herein does not require implementing specific methods or actions in the station.

The invention described herein proposes a method to relate random MAC addresses locally computed in each station (according to any possible MAC randomization process) with a persistent MAC address of the corresponding station in order to diminish the impact of the ambiguity due to MAC randomization in the operation of network resource optimizers. In the present invention, the access point and the station are uncoordinated. In order to be able to get the relation between a random MAC address and a persistent MAC address of the station, the access point sends a specific command to the station to ask whether the station can actively scan a particular, ad hoc SSID.

BRIEF DESCRIPTION OF THE DRAWINGS

A series of drawings which aid in better understanding the invention and which are expressly related with an embodiment of said invention, presented as a non-limiting example thereof, are very briefly described below.

FIG. 7 depicts an example of a table (Table 1) stored on the database of known stations.

DESCRIPTION OF A PREFERRED EMBODIMENT OF THE INVENTION

Figure 1:
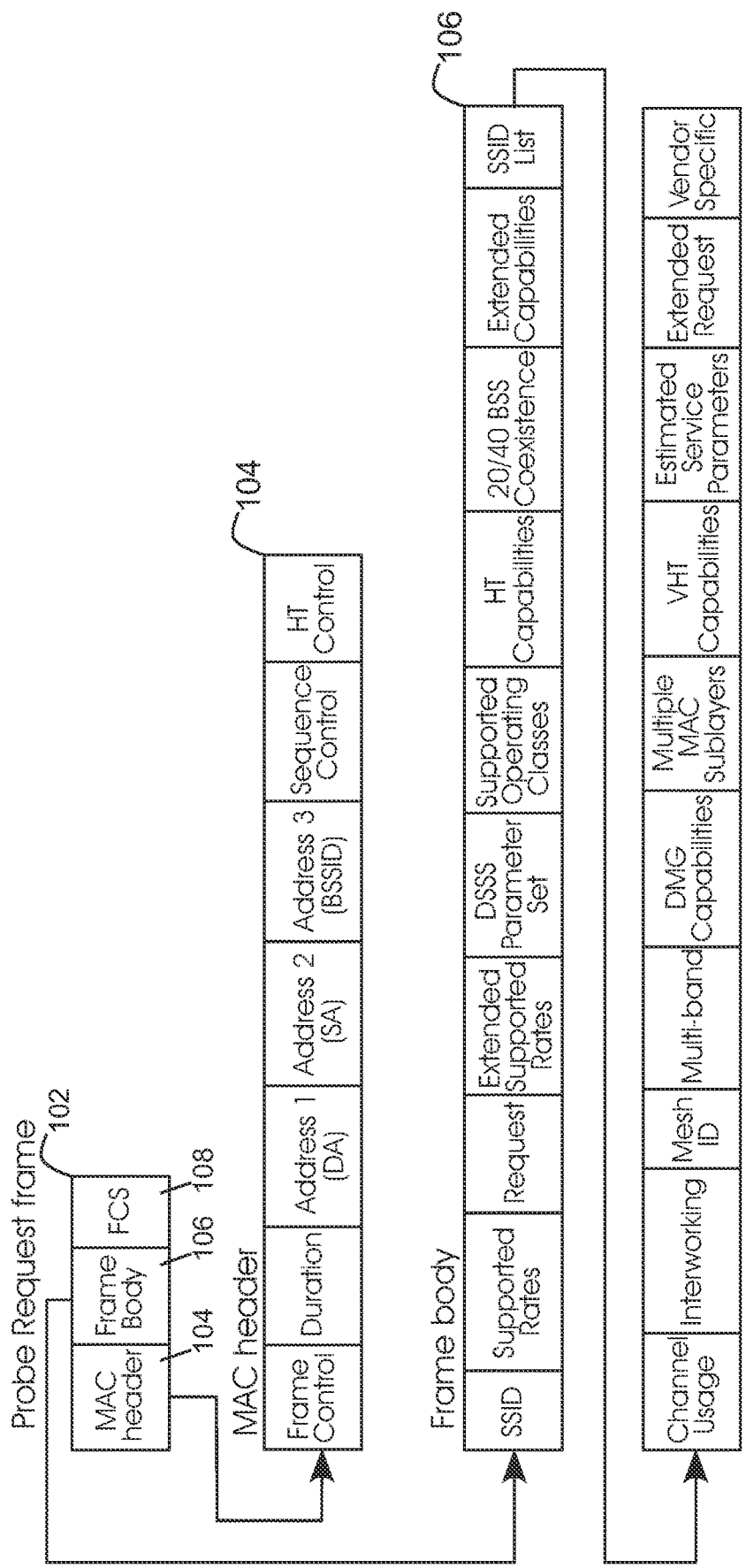
FIG. 1 shows a probe request frame format defined by the IEEE 802.11 standard.

FIG. 1 depicts a probe request frame 102 with the format defined by the IEEE 802.11 standard. The probe request frame 102 includes a MAC header 104, a frame body 106 and a frame check sequence 108 (FCS, used as a redundancy check code). For the sake of simplicity of the teachings explained herein, all the network frames used in the preferred embodiment are frames defined by the IEEE 802.11 standard. Those skilled in the art should take into account that other network frames, communication protocols, or standards may be used to achieve the same result. Therefore, the use of IEEE 802.11 frames should not be construed as limiting the scope of the invention described in this disclosure.

The invention is described below by using the accompanying drawings (FIGS. 2 to 12). In the following, we assume the wireless network shown in FIG. 2. As can be appreciated in FIG. 2, a wireless local area network 200 is composed by two access points 202 ($AP_i$ and $AP_j$), each one configured with its own SSID and radio-electric channel. Furthermore, there is one station 204 ($STA_k$) configured to connect to the SSID of $AP_i$ (i.e. $SSID_i$), which may be an access point previously known to the station (e.g. access point at home or work office) or a new access point (e.g. an access point at an airport or a cafeteria discovered in a passive or active scanning). To that end, after the authentication process, the station 204 sends an association request 206 to the access point 202 $AP_i$. If the association request 206 is accepted, the access point 202 $AP_i$ associates the station 204, sending an association response 208 to the station 204. This authentication and association process is common to any connection process of a station in a wireless local area network.

According to the present invention, once the station 204 is associated, the access point 202 $AP_i$ sends a radio measurement request 210 addressed to the station 204 (i.e. the destination address of the radio measurement request 210 is the persistent MAC address of the station 204 obtained during the association process) to actively scan a particular SSID.

Figure 3:
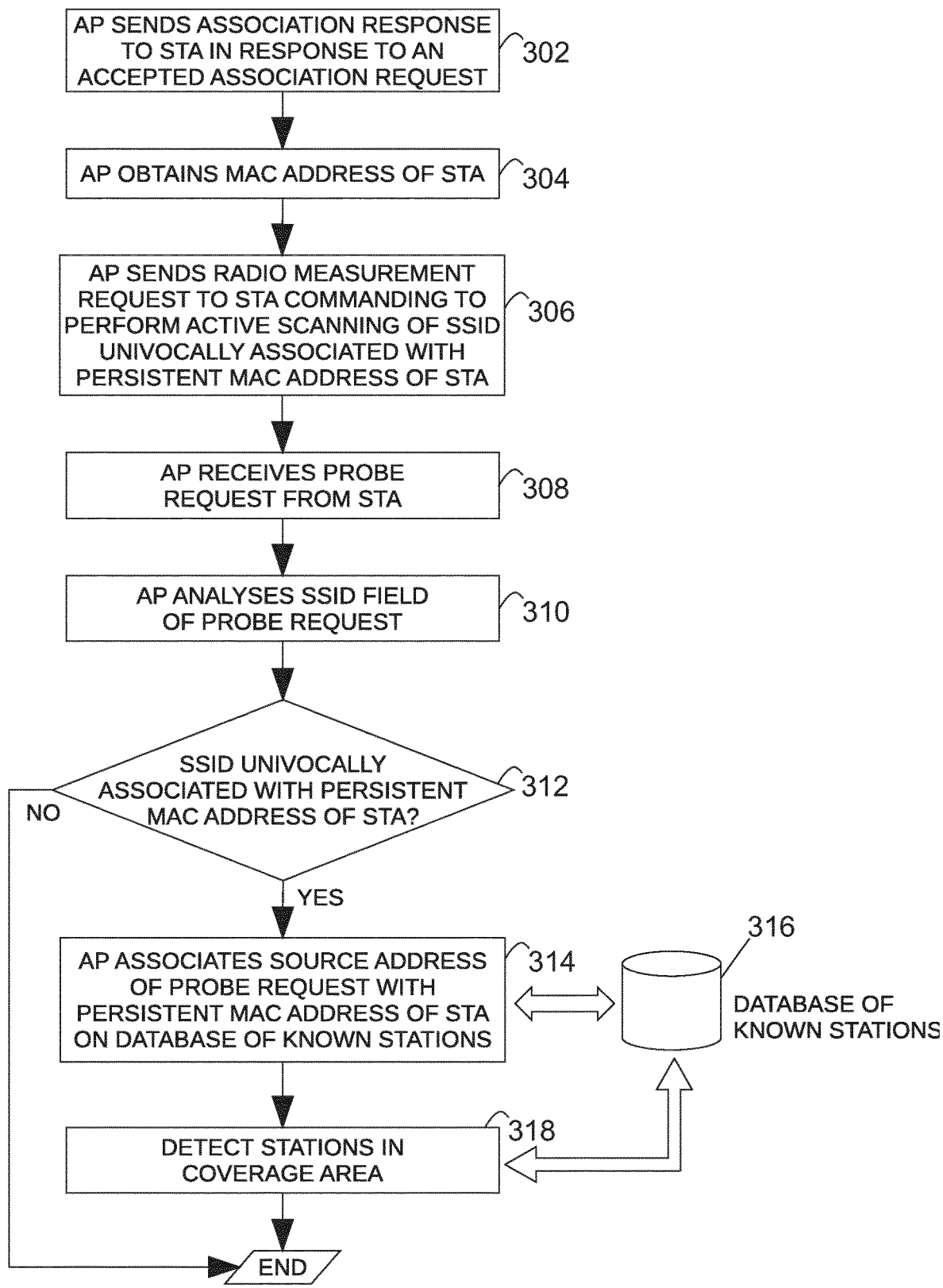
FIG. 3 represents the steps of a method of detecting stations and managing MAC address randomization in a wireless local area network according to an embodiment of the present invention.

FIG. 3 depicts a flow diagram of a method 300 of managing MAC address randomization to detect stations in a wireless local area network according to an embodiment of the present invention. Once an access point receives an association request 206 from a station 204 and the association request is accepted, the access point transmits 302 an association response 208 to the newly associated station. A persistent MAC address of the station (e.g., the unique MAC address of the wireless network interface card of the station) is obtained 304. The persistent MAC address of the station corresponds to the source address of the association request 206 received or the destination address of the transmitted association response 208.

The access point then sends 306 a radio measurement request 210 addressed to a station 204 whose association request 206 has been just received by the access point 202. The radio measurement request 210 includes a command to perform active scanning of a particular SSID comprising a unique identifier that is univocally associated with the MAC address of the station.

Whenever an access point receives 308 a probe request 212, the access point analyses 310 the SSID field of the probe request 212, checking 312 if the SSID field of the probe request 212 comprises a unique identifier univocally associated with the persistent MAC address of a station, and in that case associating 314, and storing on a database of known stations 316, the source address of the probe request 212 with the persistent MAC address of the station. At any instant, the stations within the coverage area of a particular access point 202 can be detected or determined. The detection 318 is performed by using the information stored on the corresponding database of known stations 316. For instance, the number of detected stations within the coverage area can be determined by counting the number of persistent MAC addresses of stations stored on the database of known stations (316).

The SSID field of the radio measurement request 210 is univocally associated with the persistent MAC address of the station. For example, the access point 202 may generate a unique identifier and associate the identifier with the persistent MAC address of the station by storing both parameters on a database of known stations. In a preferred embodiment, the unique identifier generated by the access point includes the persistent MAC address of the station. For instance, as depicted in the example shown in FIG. 4A, the SSID field 400 of the radio measurement request 210 may comprise two sub-fields: a common identifier 402 (i.e. a tag) and a persistent MAC address of the station 404. The SSID field 400 may comprise additional sub-fields. Alternatively, as shown in embodiment of FIG. 4B, the SSID field 400 may comprise a common identifier 402 as a first sub-field (i.e. a tag) and an encrypted identifier 406 as a second sub-field, which may be the encrypted persistent MAC address of the station, so that after decryption the persistent MAC address of the station can be retrieved. Using a common identifier 402 as a first sub-field helps the access points identify that the SSID field of a probe request 212 is of the type univocally associated with a MAC address of a station. The common identifier 402 is chosen so that it cannot correspond with a first sub-field of any current SSID used in the wireless local area network (or any other neighbor wireless networks). The encrypted data may be encrypted using a public-private key pair or any other known encryption mechanism.

By including the persistent MAC address of the station in the SSID field of the radio measurement request 210, any access point implementing the method may directly obtain a persistent MAC address of the station when receiving a subsequent probe request 212 from the station 204, even in the case that the station uses MAC address randomization, since the SSID field of the subsequent probe request 212 must be the same as the SSID field of the radio measurement request 210. The persistent MAC address of the station is thus obtained from the unique identifier of the SSID field of the probe request 212.

Figure 4A:
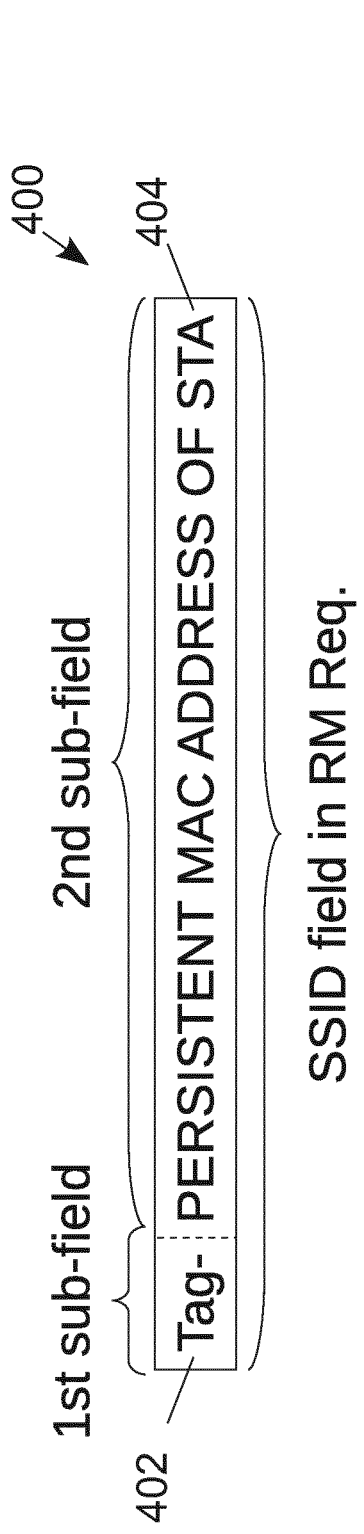
FIGS. 4A and 4B show several examples of the SSID field of radio measurement requests used in the method.

In the example of FIG. 4A, the common identifier 402 is known or shared by all the access points implementing the method (e.g. access points $AP_i$ and $AP_j$ in FIG. 2), which may belong to the same wireless network or to different wireless networks. This way, any access point receiving a probe request 212 can analyze the SSID field of the probe request and determine that it comprises a unique identifier univocally associated with a MAC address of a station if it contains a first sub-field that corresponds to the common identifier 402, which is only known and shared by the access points 202. The access point can then look up the second sub-field of the probe request to obtain the persistent MAC address of the station 404.

Figure 4B:
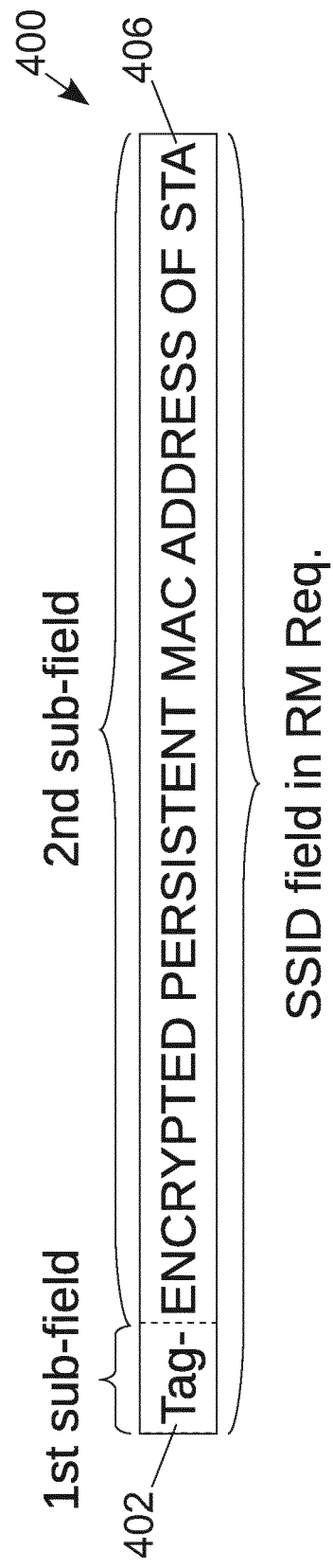

In the example of FIG. 4B, the key for decrypting the encrypted identifier 406 of the SSID field 400 is known or shared by all the access points implementing the method (for instance, the access points may be connected through a wired, secure communication used to share the encryption key). By decrypting the encrypted identifier 406 contained in the SSID field of the probe request 212, the access point obtains the persistent MAC address of the station.

Once the persistent MAC address of the station contained in the probe request 212 is recovered, it is associated 314 with the source address of the probe request 212, which would correspond with a random MAC address generated by the station when using MAC address randomization. The relation between both parameters, persistent MAC address and random MAC address of the station, is stored on a database of known stations 316 locally maintained by each access point (or, alternatively, on a database of known stations globally shared by all the access points).

Figure 2:
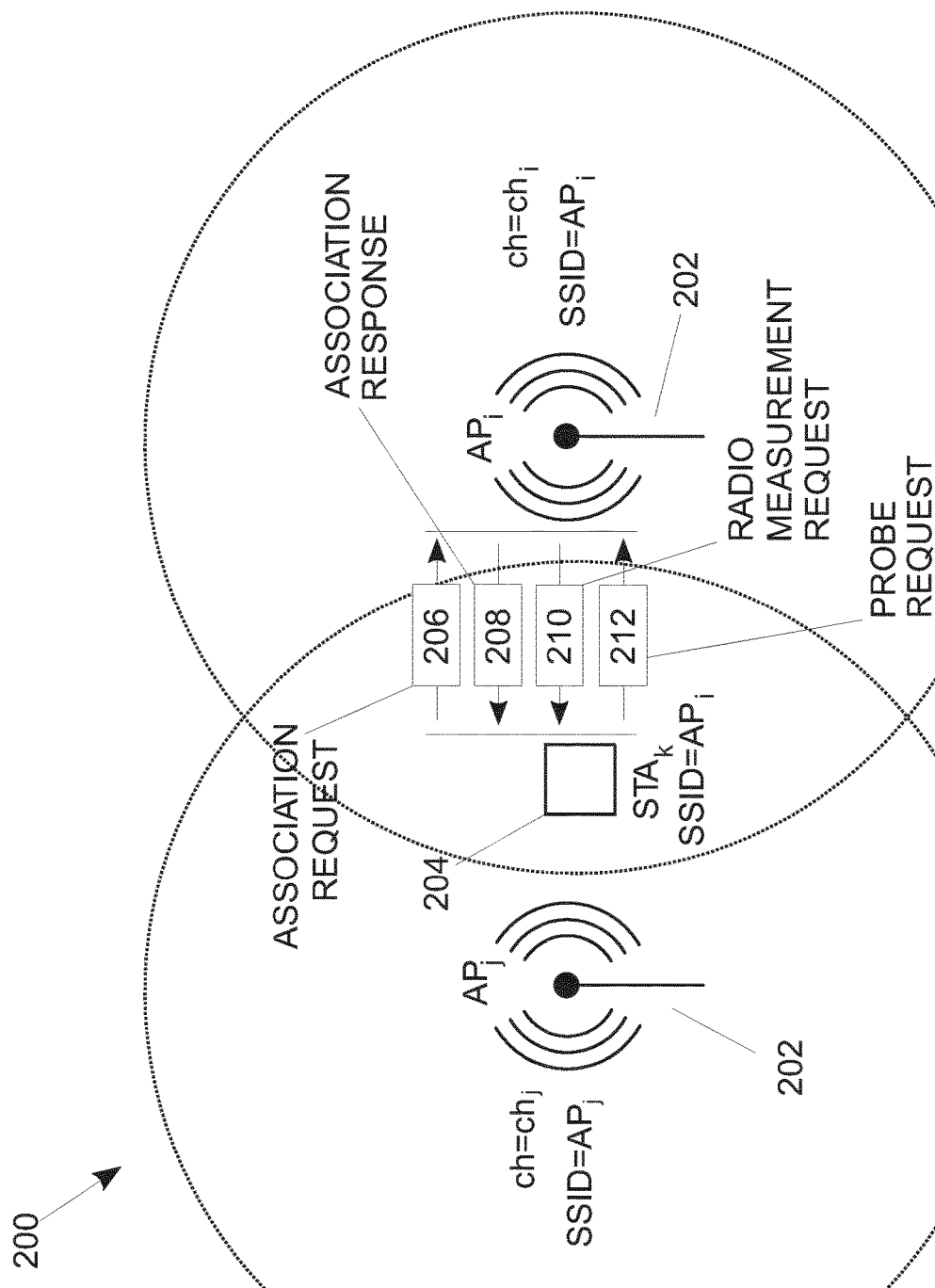
FIG. 2 depicts, in an exemplary wireless local area network, the messages exchanged between a station and the associated access point according to the present invention.
Figure 5:
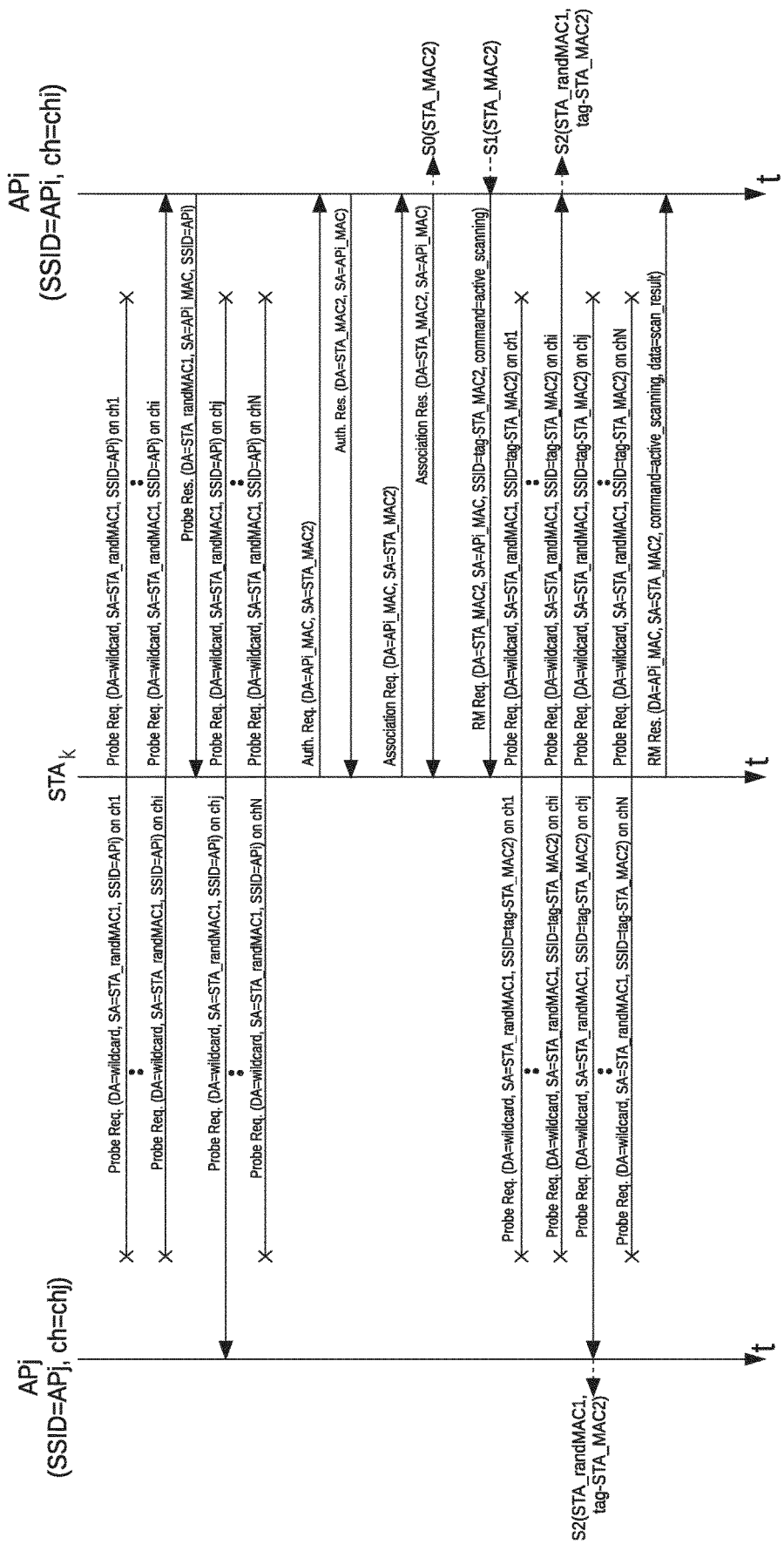
FIG. 5 shows an example of the messages exchanged between the station and access points of FIG. 2, once an access point ($AP_i$) transmits an association response frame.

An example of the messages exchanged between the entities of FIG. 2, station 204 ($STA_k$) and access points 202 ($AP_i$, $AP_j$), related to the method of the present invention is shown in FIG. 5. Firstly, there are two main methods by means of which an STA is able to discover the SSIDs/BSSIDs in its coverage area: passive scanning or active scanning.

Passive scanning consists in listening the beacon frames transmitted in all the radio-electric channels where the station 204 is able to operate. These beacon frames are management frames periodically transmitted by the access points 202 to announce their presence to all the wireless devices in its coverage area.

When using active scanning, the station 204 sends probe request frames in all the radio-electric channels where the station 204 is able to operate. After transmitting each probe request, the station 204 waits during a predefined time interval to receive the probe response frame sent by each access point whose SSID corresponds to the SSID queried in the probe request. A probe response also contains a source address (SA) field with the MAC address of the access point 202 that sent that probe response, so that the station 204 can determine which are the access points 202 that are configured with the queried SSID. Commonly, a probe request frame is sent to any access point in range. For that, the destination address (DA) field of each probe request is configured with a specific wildcard value (e.g., all bits equal to 1, FF:FF:FF:FF). The benefit of using active scanning is that the time required to be connected to a given SSID is faster than the time required when using passive scanning. This is the reason why active scanning is normally preferred over passive scanning. In the example shown in FIG. 5, it is assumed that the station 204 is configured to perform active scanning. In order to prevent user tracking, a random MAC address may be used in the source address (SA) field of every probe request frame. The random MAC address used by station $STA_k$ in the probe request is named 'STA_randMAC1' in FIG. 5.

Once the station 204 knows which are the access points 202 in range whose SSID corresponds to the SSID queried in the probe requests, the station 204 initiates the authentication and association processes with one of these access points to get access to the wireless network. The station 204 may choose, for example, the access point 202 that provides the best signal quality to it. In the example of FIG. 5, the station $STA_k$ is configured to connect to the SSID of $AP_i$. During the authentication and association processes, the station 204 should use a persistent MAC address because the access point will ignore all the data frames of unauthenticated or unassociated MAC addresses. Therefore, that persistent MAC address should also be used to transmit and receive data frames in order to avoid connectivity problems. That persistent MAC address may be the MAC address of the wireless network interface card of the station or, on the other hand, it may be a random MAC address that is computed every time the station 204 tries to be associated with another access point. In the example of FIG. 5, the persistent MAC address is named 'STA_MAC2'.

After the association process, the access point $AP_i$ does not know whether the station is using MAC randomization in probe requests and, in that case, what is the random MAC address of the station. In order to get such information, the invention described herein proposes to implement the state diagram of FIG. 6 in each access point 202 of the wireless network. As can be shown in this state diagram, for each association response frame transmitted by an access point, such access point firstly check whether there is an entry on a database of known stations associated with the persistent MAC address of the corresponding STA (i.e. STA_MAC2 in this example).

FIG. 7 shows an exemplary table, Table 1, contained in the database of known stations 316. This table stores, for each known station, the persistent MAC address (STA_MAC 702), the associated random MAC address (RandMAC 704), the time instant when the corresponding entry was updated (time 706), and a counter used to delete old entries (counter 708). If, after a station is associated to the access point, the station is not responding to the radio measurement request 210 (for instance, the station may be busy), a random MAC address (RandMAC 704) would not be associated to the persistent MAC address (STA_MAC 702) of said station; in that case, the value of RandMAC field 704 may be an unknown value (for instance, "?" in the fourth row of Table 1). If a station is not using MAC address randomization, the persistent MAC address field (STA_MAC 702) may be identical to the associated random MAC address field (RandMAC 704), as in the last row of Table 1. The stations within the coverage area of an access point are those having their respective MAC address registered in Table 1. The number of detected stations within coverage area are the number of rows of Table 1 (in the example of FIG. 7, five persistent MAC addresses of stations are stored on the database of known stations 316). The persistent MAC addresses (STA_MAC 702) having a counter (708) above a determined threshold or not having an associating random MAC address (in FIG. 7, having a value of "?" in RandMAC 704 field) may be disregarded when counting the number of stations. The number of detected stations may be complemented with the number of stations that are currently associated with each access point of the wireless network.

There may be an independent database of known stations 316 locally kept by each access point of the wireless network or a global database of known stations 316 shared by all the access points of the wireless network. Any of the known memory management systems may be used to update and manage the information of the database. If the persistent MAC address of the station is not found in the table of the database, the access point creates a new entry in the table with the persistent MAC address of that station (field STA_MAC in the table), an unknown value (e.g. "?") of the random MAC address (field RandMAC in the table), the time when such association response was sent (field time in the table), and an initial value of the counter (field counter in the table). These operations are performed in the state S0 of the state diagram shown in FIG. 6. State S0 is called in step 604, after checking in step 602 that an association response was sent to a station (just after an association request received by the access point). State S0 is shown in detail in the flow diagram of FIG. 8. Upon reception of an association request and sending an association response, the access point checks 802 if the MAC address of the station making the association request, STA_MAC, is included in the table of the database of known stations. If STA_MAC is not included in the database of known stations, the MAC address of the station (STA_MAC) is stored 804 on the database of known stations.

Figure 6:
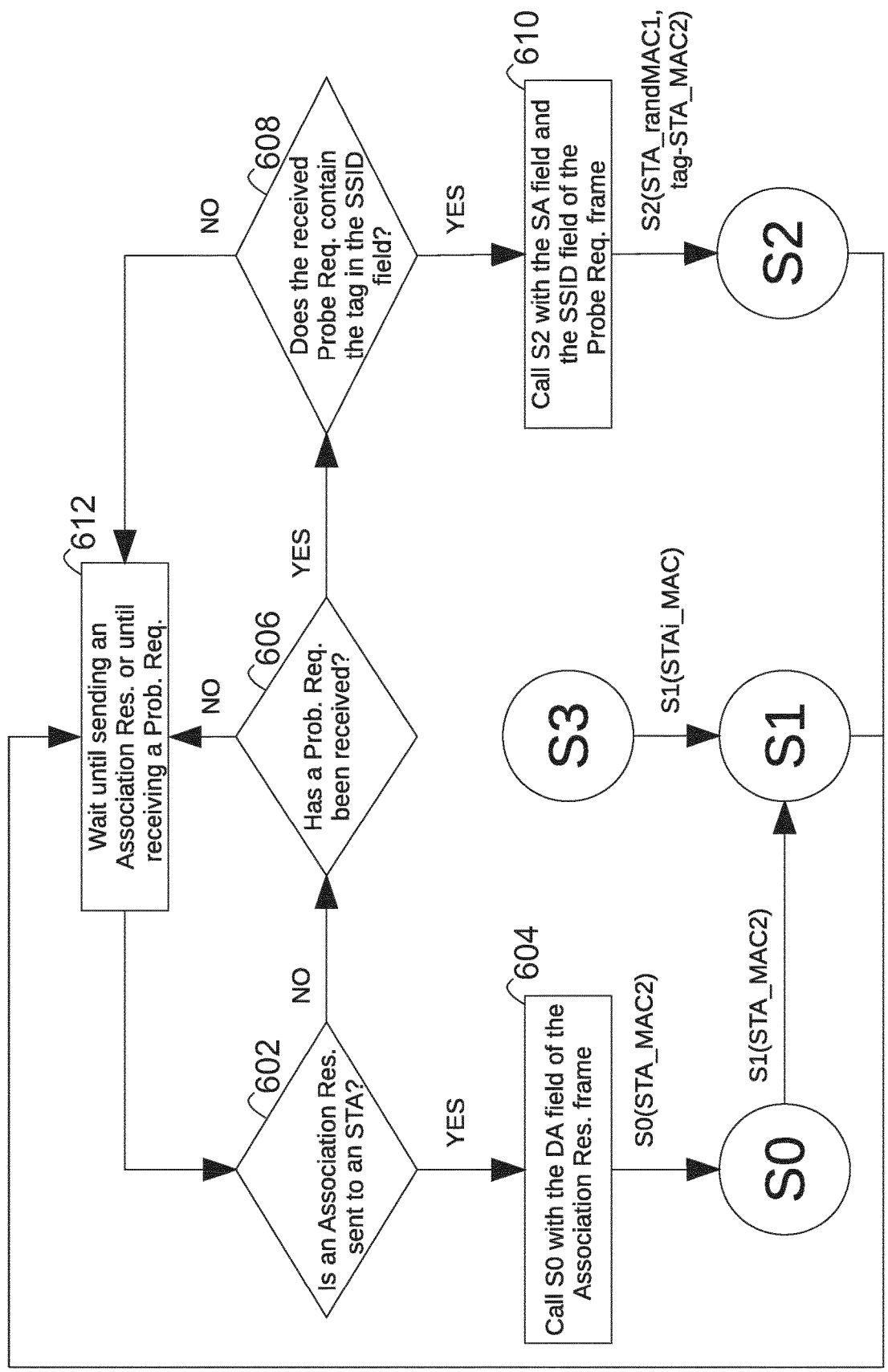
FIG. 6 depicts a state diagram of the operations performed by the access points implementing the method of the present invention.
Figure 8:
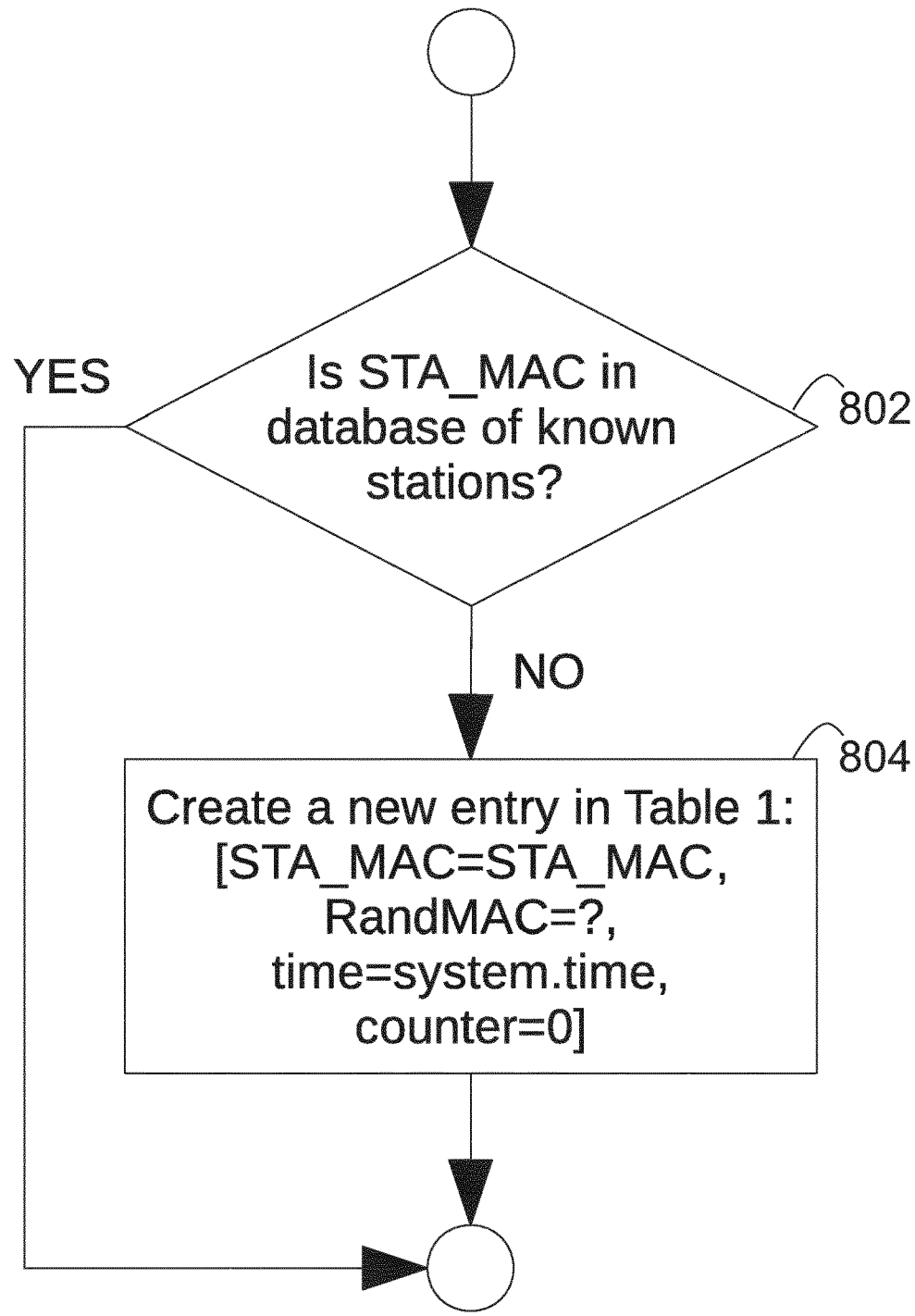
FIG. 8 represents the state S0 of the state diagram shown in FIG. 6.
Figure 9:
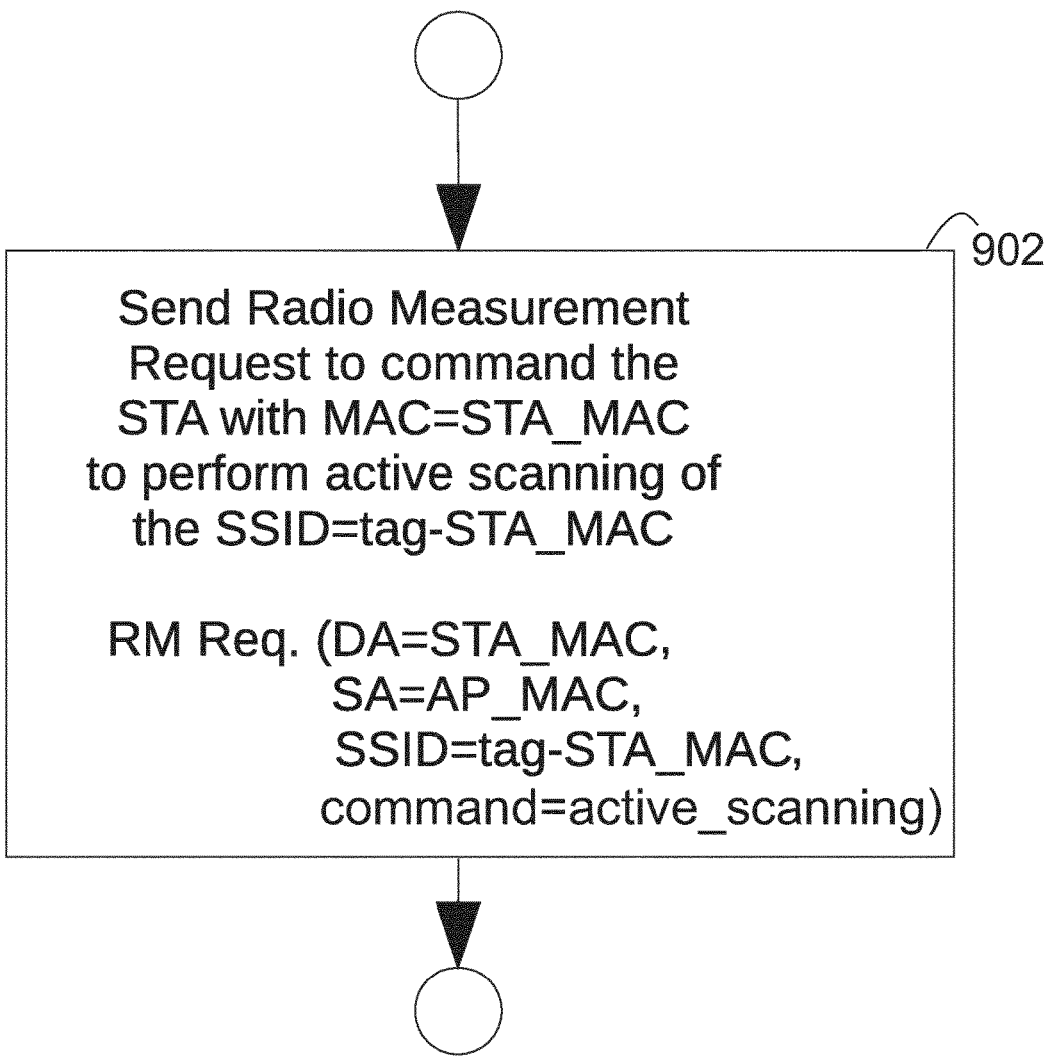
FIG. 9 represents the state S1 of the state diagram shown in FIG. 6.
Figure 10:
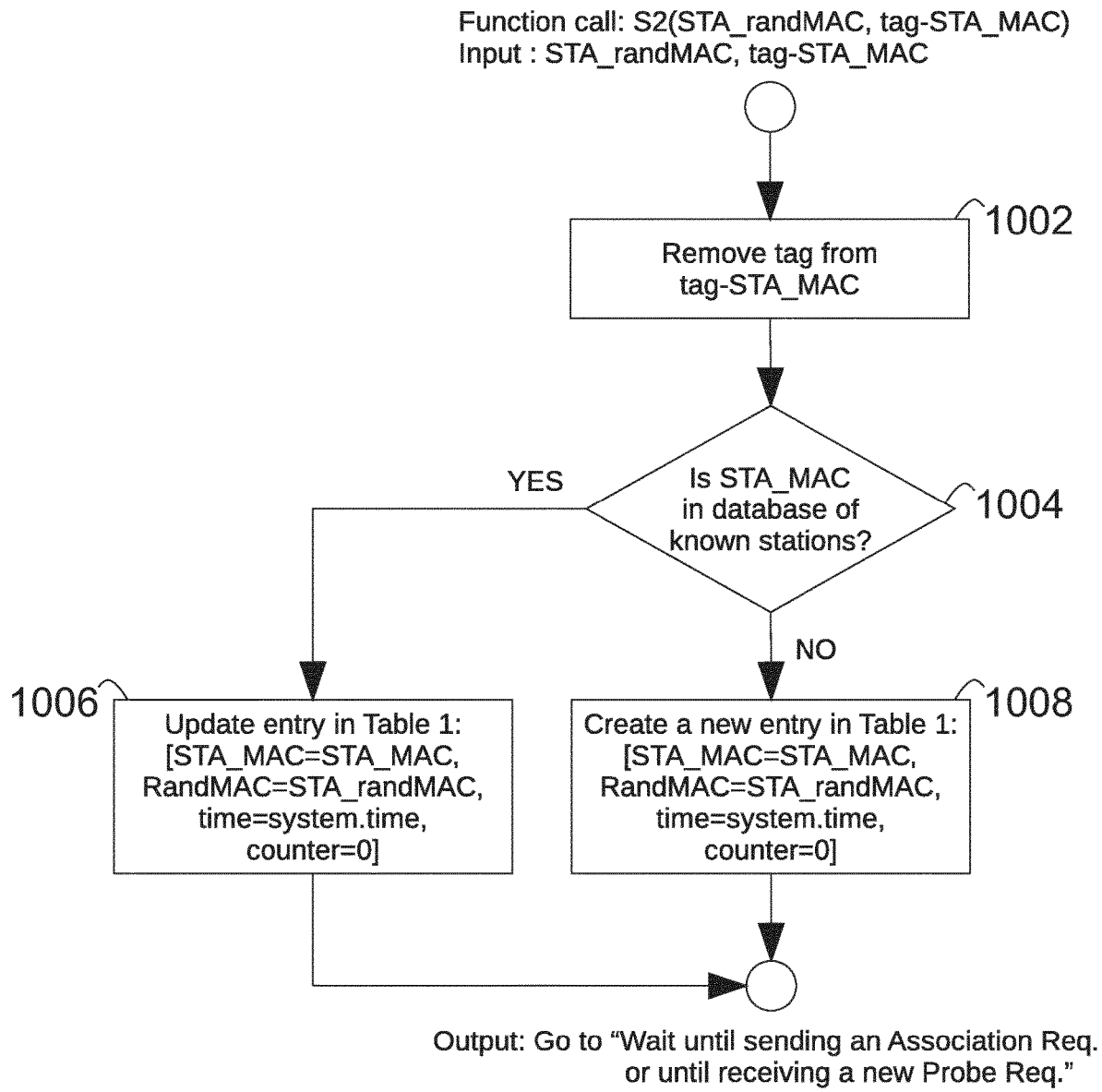
FIG. 10 represents the state S2 of the state diagram shown in FIG. 6.

Then, the access point commands the recently associated station to perform active scanning of a specific SSID (state S1 in the state diagram of FIG. 6). State S1 is represented in detail in the flow diagram of FIG. 9. The specific SSID may be composed of two sub-fields, as depicted in FIG. 4A, the first sub-field being a tag, which is predefined beforehand and known by all the access points of the wireless network. The first sub-field is followed by the second sub-field, which is the persistent MAC address of the station in question. In order to give orders to a station, the access point may use the mechanisms provided by the IEEE 802.11 standard. These mechanisms are arranged in a set of commands that are known as radio measurement requests (RM Req.) sent 902 by the access point. On the other side, the station might or might not perform the commands received in a radio measurement request depending on the capabilities and the load of the station at that moment. After accepting the radio measurement request sent by the access point, the station actively scans such specific SSID by sending probe request frames in all the radio-electric channels where the station is allowed to operate. The STA may use a random MAC address in the source address (SA) field of every probe request to prevent user tracking. Therefore, when actively scanning the specific SSID of FIG. 4A, the station announces its random MAC address (SA field of the probe request MAC header 104) and its persistent MAC address (SSID field of the probe request frame body 106) in the same management frame, see FIG. 1. This way, all the access points of the wireless network that have received such probe request can directly associate both MAC addresses of that station.

Back to the state diagram of FIG. 6, every time an access point receives 606 a probe request frame, it checks 608 whether the SSID field contains the 'tag' sub-field and, if so, state S2 is called in step 610 (if not, the access point waits 612 until an association response is sent or a probe request is received). The access point carries out the state S2 as depicted in flow diagram of FIG. 10. In state S2, the access point firstly obtains the persistent MAC address of the station by removing 1002 the 'tag' sub-field within the SSID field of the probe request frame body. Afterwards, the access point checks 1004 whether there is an entry in the database of known stations 316 associated with that persistent MAC address. If that persistent MAC address is found in the database of known stations 316, the access point updates 1006 the corresponding entry with the random MAC address received in the source address (SA) field of the probe request and the time when the probe request was received. Furthermore, the counter of that entry is reset to its initial value. Otherwise, the access point creates 1008 a new entry in the database with the newly received information (i.e. the persistent MAC address (within the SSID field of the probe request frame), the random MAC address (SA field of the probe request frame), time when the probe request frame was received, and a counter set to its initial value).

Finally, the information contained in the database of known stations 316 is periodically updated by the access points of the wireless network. This is performed in state S3 of the state diagram shown in FIG. 6. State S3 is depicted in detail in the flow diagram of FIG. 11. In S3, the access point periodically inspects the database of known stations 316 searching for the stations associated with the access point whose information is incomplete (i.e. when the field 'RandMAC' is unknown) or should be updated (i.e. when more than T seconds has passed since the last update). The state S1 is carried out for every station that meets one of these two conditions, and as a consequence, the state S2 would also be performed for every station that accepts to do active scanning of the SSID described above.

Figure 11:
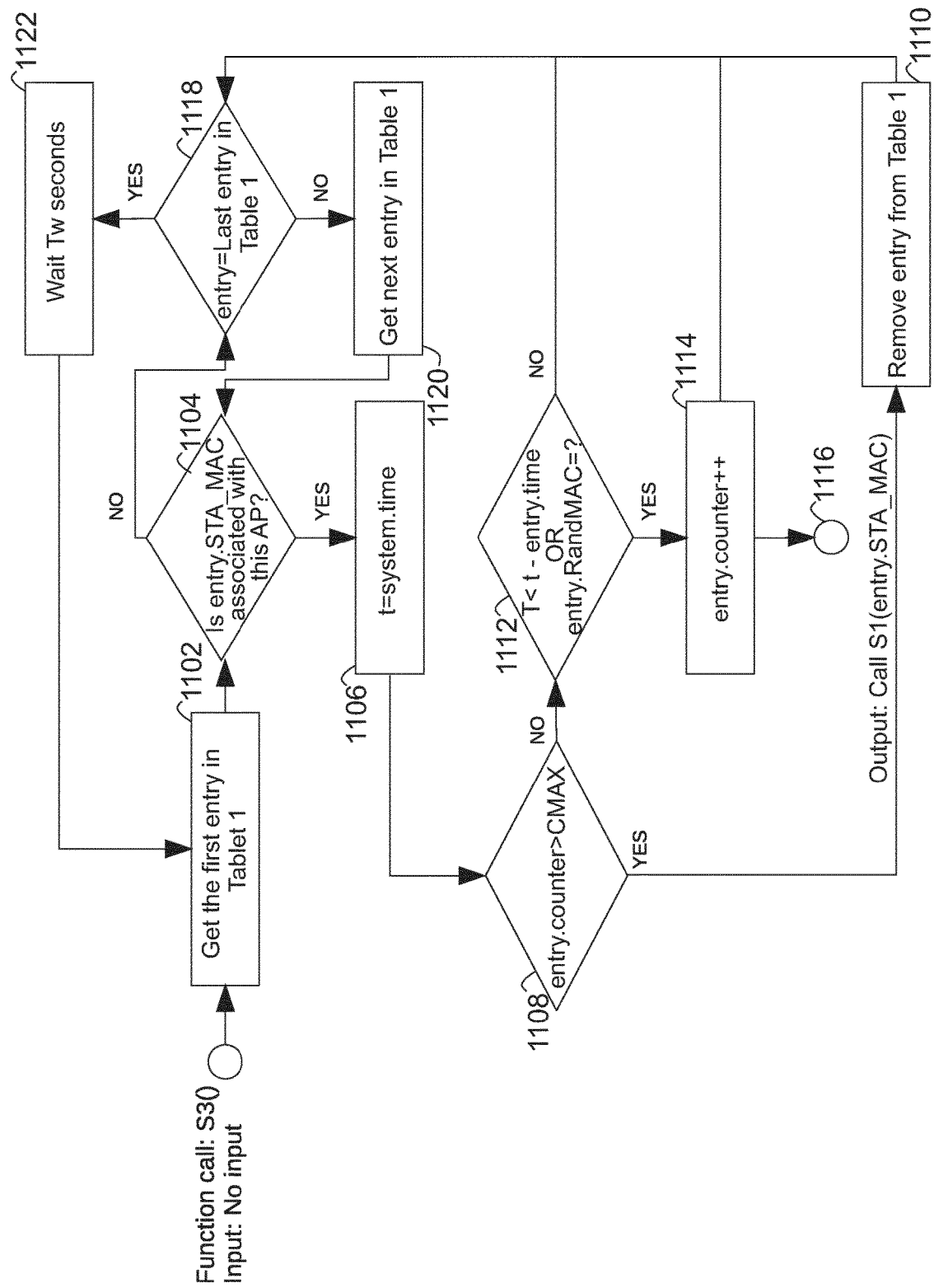
FIG. 11 represents the state S3 of the state diagram shown in FIG. 6.

In the embodiment of S2 shown in FIG. 11, the first entry of Table 1 of the database of known stations 316 is retrieved 1102. For said entry, the access point checks 1104 whether the persistent MAC address of the station corresponds to a station associated to the access point. In that case, the current time is annotated in 1106 and a counter is checked 1108. If a count of the counter exceeds a determined threshold (CMAX), the corresponding entry is removed from the database of known stations 316, otherwise it is checked 1112 whether one of the following two conditions is complied with: (i) the random MAC address ('RandMAC') of the entry is unknown, or (ii) an amount of time higher than a certain threshold (T) has passed since the last update. If any of these conditions are met, the counter 1114 is increased and state S1 (as described in FIG. 9) is called 1116. After analyzing the corresponding entry of the database of known stations 316, it is checked 1118 whether the entry is the last entry, and subsequent entries are analyzed 1120. When the last entry is reached, the access point waits 1122 a certain amount of time (Tw) to start again the update process. This way the update is periodically performed.

Figure 12:
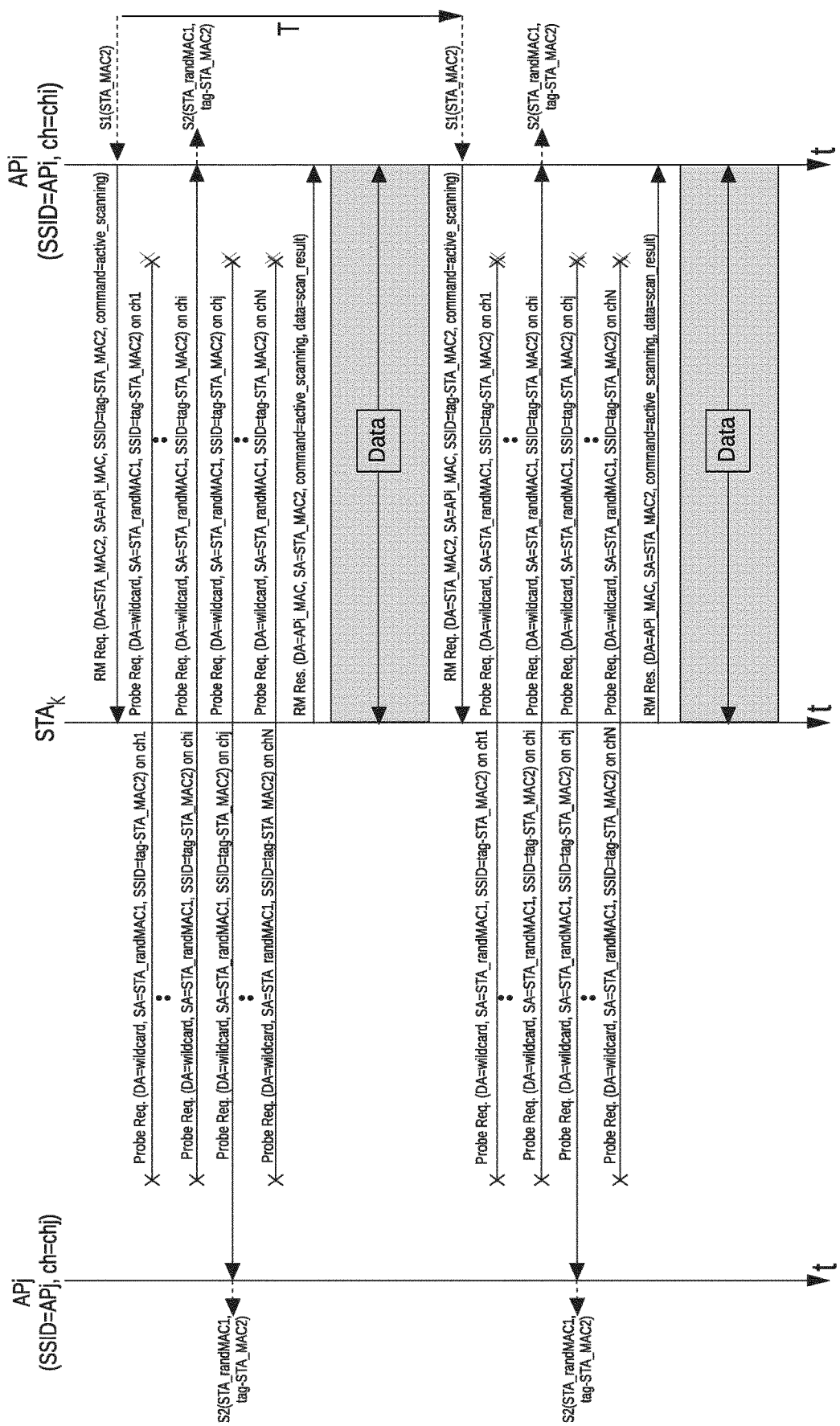
FIG. 12 an example of messages exchanged between a station and the access points to periodically update the information stored on the database of known stations.

An example of the message passing to periodically update the information stored in Table1 of the database of known stations 316, associated with state S3, is depicted in FIG. 12, wherein it can be observed that state S1 may be called (step 1116 in FIG. 11) periodically, after a period of time T. When in state S3, the access point is also in charge of deleting all the old entries of its associated stations. As previously explained, an entry is considered as an old entry when its counter exceeds a maximum value (CMAX). Furthermore, a waiting time between consecutive readings of Table 1 (referred to as Tw in FIG. 11) may also be considered. This waiting time Tw may be configured to be the maximum time needed to receive a radio measurement response after transmitting its corresponding radio measurement request. In the invention described herein, the access points of the wireless network might not be synchronized. Therefore, each access point may read or write in Table 1 at different time intervals.

Figure 13:
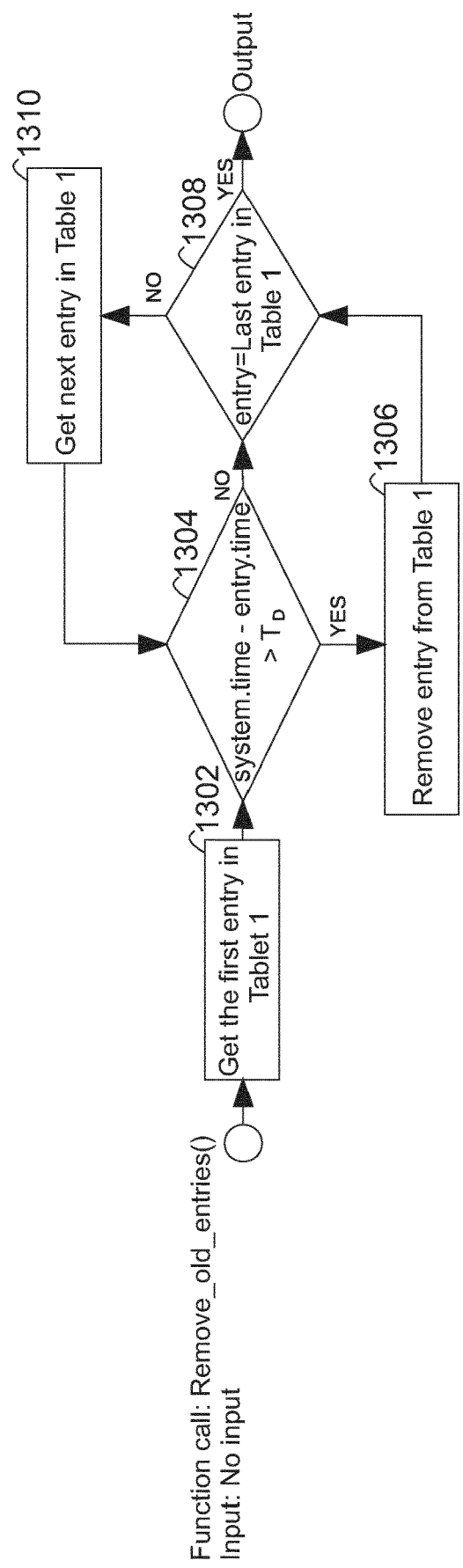
FIG. 13 shows an exemplary flow diagram of a function used to remove old entries of non-associated stations.

The access point may also periodically delete old entries of STAs that are considered to be no longer associated to any access points of the wireless network, as shown in flow diagram of FIG. 13. To that end, the access point retrieves 1302 the first entry of the database of known stations 316. In 1304, it is checked whether the time elapsed from the last update is higher than a certain threshold ($T_D$), and in that case the entry is removed 1306. Then, it is checked 1308 whether the current entry is the last entry, and subsequent entries are analyzed 1310.

Since state S1 is called by each access point of the wireless local area network 200 at least once an amount of time T is passed (assuming that waiting time Tw is lower than T, see FIG. 11), the threshold $T_D$ should be greater than the threshold T to make sure that the access point had the opportunity to update the database of known stations 316 with information regarding stations associated to other access points (by acquiring and analyzing the probe requests 212 sent by the stations in response to the radio measurement requests 210 sent by the associated access point).

This way, all the access points have updated information on the actual number of stations (associated with one or another access point) within the coverage area, in spite of the use or not of MAC address randomization by the stations.

Figure 14:
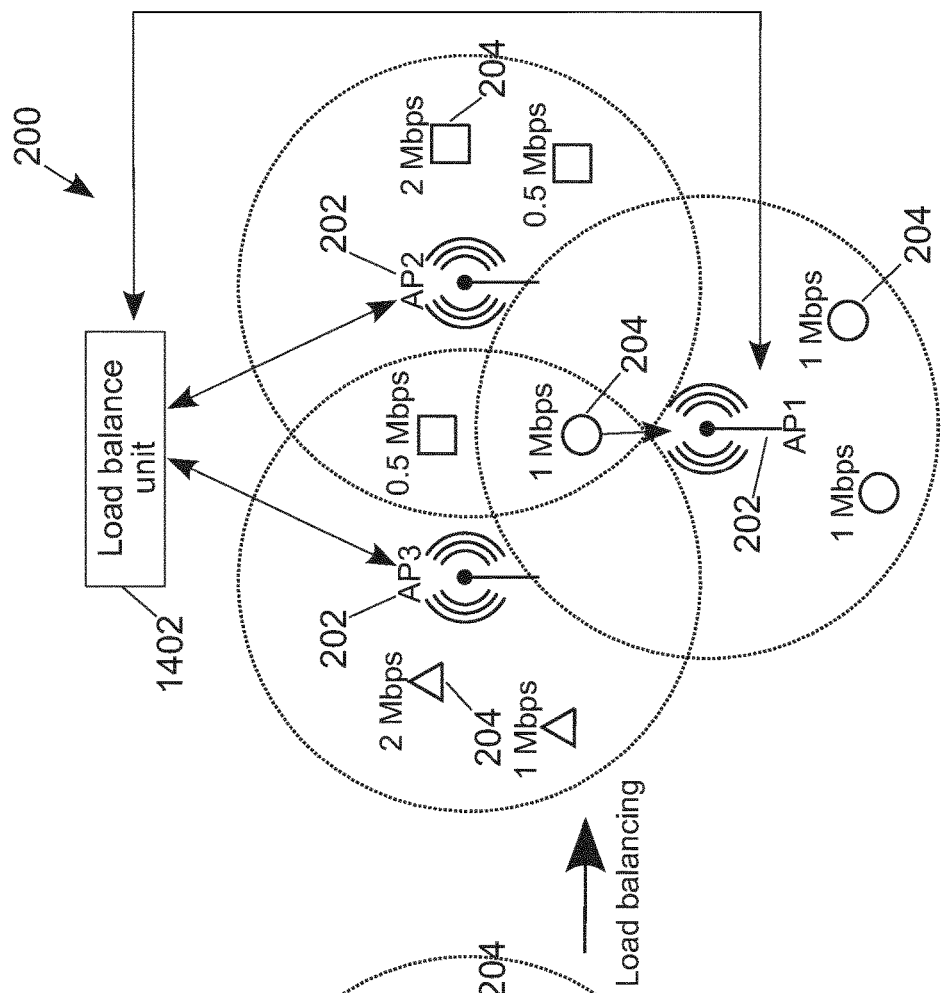
FIG. 14 depicts an example where the invention is used for load balancing in a wireless local area network.
Figure 14:
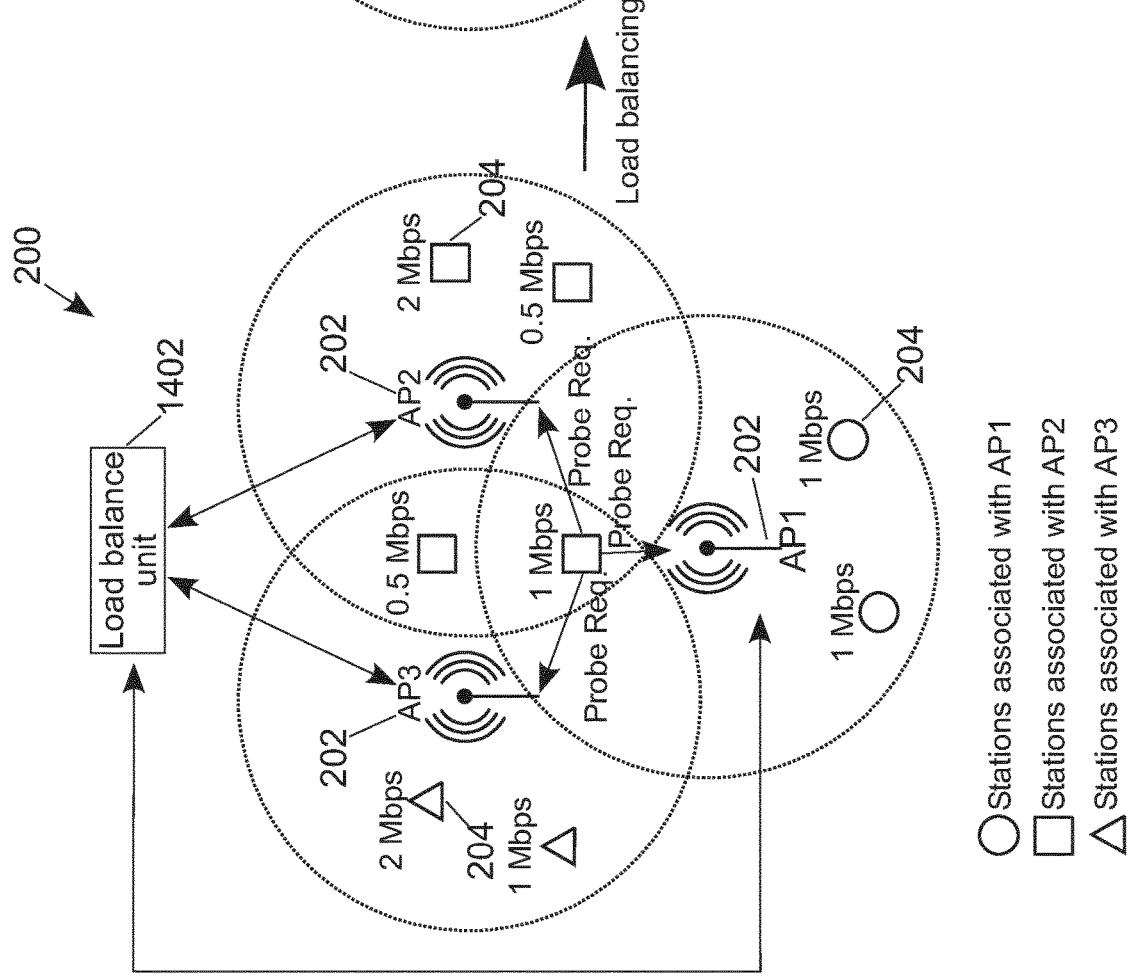

Those skilled in the art should realize that the invention described herein has applications in many scenarios. The actual number of stations within the coverage area of each access point of a wireless network is an important key performance indicator (KPI) used by many network resource optimizers, such as load balancing methods. In load balancing optimizers, determine the number of stations within the coverage area of each access point is a crucial operation needed to properly redistribute the stations among the set of access points of the wireless network. An example of that use case is depicted in FIG. 14, wherein the above mentioned KPI is jointly used with the traffic load of each station 204 to balance the load of the wireless network 200. For that, the access points 202 (AP1, AP2, AP3) of a wireless network 200 may use the teachings described herein to tackle the problems derived from MAC randomization, get the persistent MAC address from the probe requests 212 sent by the stations, and re-associate the selected stations to another access point (in the example of FIG. 14, a station associated to access point AP2 is re-associated to access point AP1) in such a way that the load of the wireless network is balanced, considering the actual number of stations detected by each access point and the traffic load of each station 204. In the example of FIG. 14, prior to applying the load balancing, the traffic load for the access points amounts to 2 Mbps for AP1, 4 Mbps for AP2 and 3 Mbps for AP3. After load balancing, the traffic load is balanced to 3 Mbps for each access point, since one of the stations (with a traffic load of 1 Mbps) associated to AP2 has been re-assigned to AP1. A load balance unit 1402 is in charge of applying the load balancing of the network. The load balance unit 1402 may be implemented in a central control system, as depicted in the example of FIG. 14, or it may be implemented in a distributed way among the access points 202 of the wireless networks (e.g. each access point 202 having a load balance unit). Furthermore, the decision-making carried out by such load balance unit 1402 may include physical information of the probe requests received by the access points (e.g. signal-to-noise-plus-interference ratio (SNIR), received signal strength indicator (RSSI), etc.), the location of each station, and historic data used to infer the more probable paths for each station.

Figure 15:
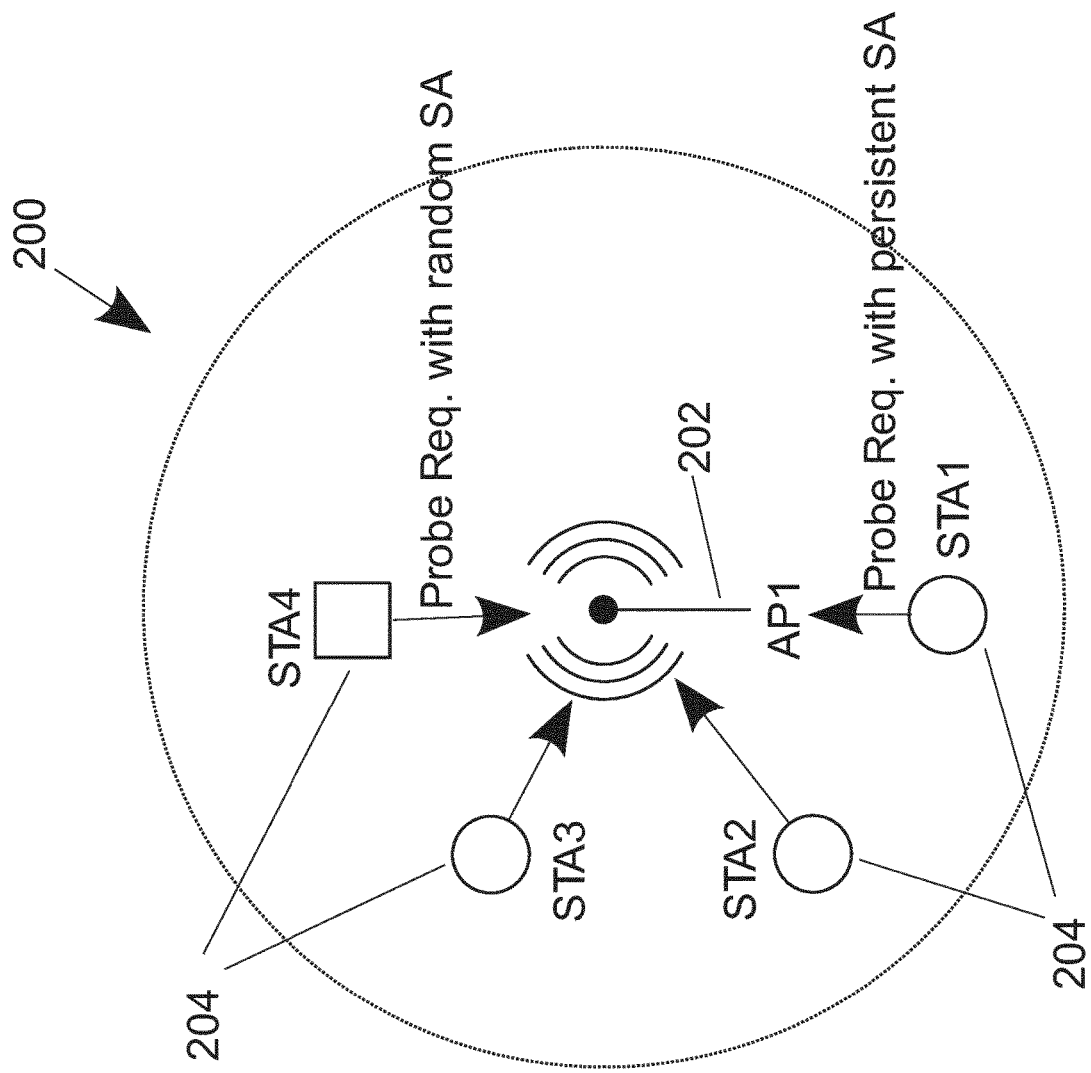
FIG. 15 depicts an example where the invention is used in presence detection and/or device counting systems.

Another scenario where the invention described herein may be used is in presence detection systems and in device counting systems, systems that are widely used in, for instance, shopping malls. That systems commonly use the number of unique MAC addresses sent in the source address of probe requests to count the number of Wi-Fi devices that are within the coverage area of the wireless network. Therefore, in case when one or more stations use any MAC randomization mechanism, these systems would provide wrong results unless they use the method of the present invention designed to get the persistent MAC address of each station. An example is shown in FIG. 15, where it is depicted a wireless network 200 composed by one access point 202 and four stations 204, one of which (station STA4) implements a MAC randomization mechanism in its probe request frames. According to FIG. 15, and assuming, for example, that every station 204 sends a probe request 212 every second and that a new random MAC is computed every 5 seconds, a prior-art counting system would detect that there are 15 stations in the coverage area of access point 202 (AP1) during the first minute, 27 stations during the first two minutes, and so on; whereas a counting system that uses the invention described herein would detect that there are actually four stations in the coverage area of access point 202 (AP1), independently on the time window during which the system performs the measurements. The present invention may therefore be used for counting people (i.e. counting their associated mobile devices) in public spaces, such as shopping malls, museums or stadiums, where the mobile devices (i.e. stations) are connected to a wireless local area network (e.g. Wi-Fi) in the public space.

The invention claimed is:

1. A method of detecting stations in wireless local area networks, comprising:
  upon transmission, by an access point of a wireless local area network, of an association response to a station, sending a radio measurement request addressed to the station, wherein the radio measurement request includes a command to perform active scanning of a specific SSID, wherein the SSID field of the radio measurement request comprises a unique identifier univocally associated with a persistent MAC address of the station, wherein the unique identifier comprises a common identifier as a first sub-field;
  actively scanning, by the station, the specific SSID by sending probe requests in the radio-electric channels where the station operates, wherein the SSID field of the probe requests is the SSID field of the radio measurement request;

receiving, by at least one access point of one or more wireless local area networks, a probe request sent by the station;

analyzing, by the at least one access point that received a probe request, the SSID field of the probe request and determining that the SSID field of the probe request comprises a unique identifier univocally associated with a persistent MAC address of the station if—when the SSID field of the probe request contains a first sub-field that corresponds to the common identifier, and in that case:

obtaining the persistent MAC address of the station from the unique identifier of the SSID field of the probe request, and associating the source address of the probe request with the persistent MAC address of the station on a database of known stations;

detecting stations within the coverage area of the at least one access point based on the information stored on the database of known stations.

2. The method of claim 1, wherein the unique identifier of the SSID field of the radio measurement request comprises the persistent MAC address of the station.

3. The method of claim 2, wherein the common identifier is shared between a plurality of access points.

4. The method of claim 1, wherein the unique identifier of the SSID field of the radio measurement request comprises an encrypted identifier containing the persistent MAC address of the station.

5. The method of claim 4, wherein the common identifier and the key for decrypting the encrypted identifier is shared between a plurality of access points.

6. The method of claim 1, further comprising:

upon transmission of an association response by the access point, checking when the destination address of the association response is not stored on the database of known stations, and in that case storing the destination address of the association response on the database of known stations as the persistent MAC address of a station.

7. The method of claim 1, further comprising removing entries from the database of known stations corresponding to persistent MAC addresses of stations after a predetermined elapsed count (CMAX) or elapsed time ($T_D$).

8. The method of claim 1, further comprising repeatedly updating the database of known stations by sending radio measurement requests addressed to the stations associated with the access point.

9. A method of load balancing in wireless local area networks, comprising:

detecting the stations within the coverage area of each access point of a plurality of access points implementing the method of claim 1;

applying load balancing to wireless local area networks corresponding to the plurality of access points, wherein the load balancing is determined based at least on the stations within the coverage area of each access point and the traffic load of each station.

10. A system for detecting stations in wireless local area networks, the system comprising at least one access point of one or more wireless local area networks, wherein each access point of the system is configured to:

upon transmission of an association response to a station, send a radio measurement request addressed to the station, wherein the radio measurement request includes a command to perform active scanning of a specific SSID, wherein the SSID field of the radio measurement request comprises a unique identifier univocally associated with a persistent MAC address of the station, wherein the unique identifier comprises a common identifier as a first sub-field;

upon reception of a probe request sent by the station, analyze the SSID field of the probe request and determine that the SSID field of the probe request comprises a unique identifier univocally associated with a persistent MAC address of the station when if the SSID field of the probe request contains a first sub-field that corresponds to the common identifier, and in that case:

obtain the persistent MAC address of the station from the unique identifier of the SSID field of the probe request, and associate the source address of the probe request with the persistent MAC address of the station on a database of known stations;

detect stations within the coverage area of the access point based on the information stored on the database of known stations.

11. The system of claim 10, wherein the unique identifier of the SSID field of the radio measurement request comprises the persistent MAC address of the station, and wherein the common identifier is shared between the access points of the system.

12. The system of claim 11, wherein the persistent MAC address of the station is included in an encrypted identifier in the SSID field of the radio measurement request, wherein the key for decrypting the encrypted identifier is shared between the access points of the system.

13. A system of load balancing in wireless local area networks, comprising:

the system for detecting stations in wireless local area networks according to claim 10, wherein the system comprises a plurality of access points;

at least one load balance unit configured to apply load balancing to one or more wireless local area networks corresponding to the plurality of access points, wherein the load balancing is determined based at least on the detected stations within the coverage area of each access point and the traffic load of each station.

* * * * *